H. USHER AND C. H. J. GOOCH.
MANUFACTURE AND PRODUCTION OF BOXES FOR POSTAL AND OTHER PURPOSES.
APPLICATION FILED NOV. 5, 1920.

1,396,605.

Patented Nov. 8, 1921.

INVENTORS
HAROLD USHER
CHARLES H. J. GOOCH
BY
ATTORNEYS

UNITED STATES PATENT OFFICE.

HAROLD USHER AND CHARLES HENRY JASPER GOOCH, OF LONDON, ENGLAND, ASSIGNORS TO WOOD POSTAL BOXES LIMITED, OF STRATFORD, ENGLAND, A CORPORATION OF GREAT BRITAIN.

MANUFACTURE AND PRODUCTION OF BOXES FOR POSTAL AND OTHER PURPOSES.

1,396,605.          Specification of Letters Patent.          Patented Nov. 8, 1921.

Application filed November 5, 1920. Serial No. 421,920.

*To all whom it may concern:*

Be it known that we, HAROLD USHER and CHARLES HENRY JASPER GOOCH, both subjects of the King of Great Britain, and both residing at Standard Works, Fairland Road, Stratford, London, England, have invented new and useful Improvements in the Manufacture and Production of Boxes for Postal and other Purposes of which the following is a specification.

Our invention has for its object to provide boxes for postal and other purposes which boxes are very readily and cheaply made and are readily and securely closed and also readily opened, without being liable to become accidentally opened, while there is no necessity for the fittings which are usually employed in boxes of the character to which our invention relates. Our improved boxes are especially adapted for high speed packing.

According to our invention the body-part of the box is made of one piece of wood, or other suitable material, (bored, or turned, with a recess, or recesses, or equivalent— provided with cavities for the article, or articles, to be contained in the box) and the lid, or cover, is also made of one piece of wood, or other suitable material, and the end, or side, of the box, to which the lid, or cover, is applied, is provided with grooves, or other recesses, and ribs, or other projections, and the lid, or cover, is provided with corresponding ribs, or other projections, and grooves, or other recesses, they all being so relatively arranged, shaped and disposed, and of such depth, that, when the lid, or cover, is pressed onto the end or side, of the body-part of the box, the ribs, or other projections, on the lid, or cover, will enter the grooves, or other recesses, in the end or side, of the body-part and the lid, or cover, can be pressed, into engagement so that it is close to the body-part and effectually closes the box and maintains the closure by the frictional contact of the ribs, or other projections, and grooves, or other recesses, of the body-part and the lid, or cover, against each other and, although the lid, or cover, can be readily removed to open the box, it will not be liable to become accidentally detached.

The recesses, and projections can be of any suitable shape which will allow of the lid, or cover, being pressed into place.

Figure 7:
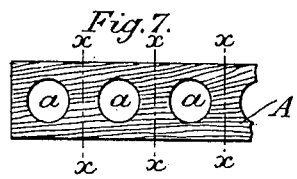
Figure 8:
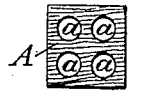
Figure 9:
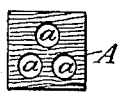
Figure 10:
Figure 11:
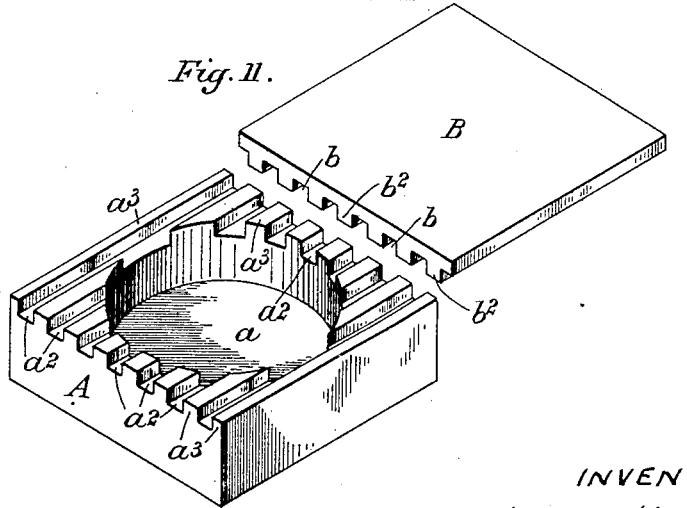

While not limiting ourselves to precise constructions a wooden box, to hold a glass tube for instance, may be made in accordance with our invention as follows. In describing these we will refer to the accompanying drawing wherein Figures 1, 2, 3 and 4 show, in perspective, boxes made with various forms and numbers of ribs, or projections, and grooves, or recesses. Fig. 5 is a perspective view of the box shown in Fig. 1 with the cover removed, Fig. 6 is a transverse section through the body-part. Fig. 7 shows part of a length of wood from which the body-part of the boxes can be cut as hereinafter explained. Figs. 8, 9 and 10 show boxes with more than one cavity for the articles to be contained in the box and Fig. 11 shows in perspective a box suitable for containing a watch, or small receptacle, containing ointment for example. Corresponding parts are marked with the same reference letters in all the figures.

Figure 1:
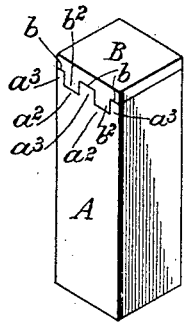
Figure 2:
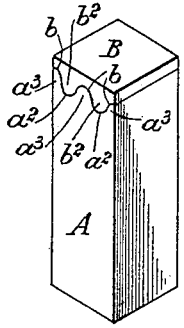
Figure 3:
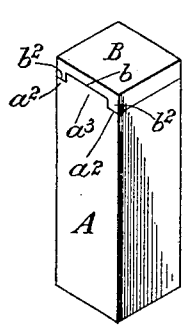
Figure 4:
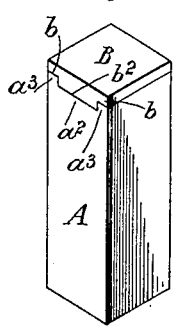
Figure 5:
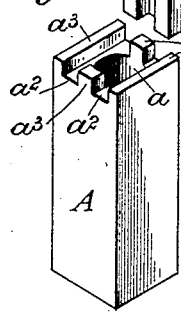
Figure 6:

We bore, or turn, to a sufficient depth, from one end of a suitable piece of wood, A, a hole $a$ as shown in Figs. 5 and 6, or any suitable number and arrangement of holes, for instance four as shown in Figs. 8 and 10, or three as shown in Fig. 9, and afterward we cut a transverse groove, or transverse grooves, $a^2$ across the wood at the open end, or ends, of the said hole, or holes, so as to leave ribs $a^3$, as in Figs. 1, 2 and 4, or a rib $a^3$, as in Fig. 3, between the said grooves and we then cut grooves $b$, as in Figs. 1, 2 and 4, or a groove as in Fig. 3, in the underside of the lid B, but so situated that they correspond with the position of the transverse ribs $a^3$, while the ribs $b^2$ between correspond with the recesses $a^2$, in the body-part A. When the lid B is pressed onto the open end of the body-part A, the rib, or ribs, $b^2$, on the lid B enter the groove, or grooves, $a^2$, in the end of the body-part A and when the lid B is pressed down to form a tight closure at the end of the box, the said lid B will be held securely in place by frictional contact and, while not liable to become accidentally displaced, it can be readily removed when the box is to be opened. If the boxes be of rectangular form in cross section, as illustrated, the lids B and the bodies A, of the boxes can each be cut transversely from a length of wood which has been previously longitudinally grooved. Fig. 7 represents a part of such a length of wood for the body portion. When the two lengths of wood have been grooved, as hereinbefore described, and the lid-portion has been put in place on the body-portion, the two portions can be cut through to form the required boxes, the cutting being effected so as to leave one, two, or any other required number of, cavities $a$, in each cut-off portion; for instance, the cuts will be on the dotted lines $x$, when boxes with but one cavity (as in Fig. 6) are required.

The boxes in accordance with this invention will be very useful, for example, for securely holding a glass tube, or two, or more, glass tubes, containing, for instance, matter for medical purposes. A box can be similarly made (as illustrated, for instance, in Fig. 11) from a piece of wood with a body-part A having, turned in it, a shallow recess $a$ or recesses, (say for example one recess as shown to hold a watch, or the like) the wood around the said recess, or recesses, being grooved and (as at $a^2$) the underside of a similarly shaped lid, or cover, (also made from one piece of wood) being provided with corresponding ribs $b^2$ to be pressed as hereinbefore explained, into the grooves in the body-part A of the box.

It will be understood that the holes, or recesses, $a$ may be of any suitable relative depth and diameter according to the articles to be held therein and that the boxes may be of any required shape and of any required dimensions in any direction.

Although we have described the boxes as being made of wood it will be understood that we do not limit ourselves to the use of wood as other material suitable to the purposes of our invention can be used.

What we claim is:—

A box with a body-part made in one piece in which is, or are, a recess, or recesses, for the article, or articles, to be contained therein, and a lid, or cover, also made in one piece, the said body-part and lid, or cover, being provided with grooves, or recesses, and ribs, or other projections, so arranged, shaped, and disposed, that the lid, or cover, when put in place on the body-part, can be pressed down into the closed position so that the ribs, or other projections, on the one part are engaged with the grooves, or recesses, in the other part; substantially as hereinbefore explained.

In testimony whereof we have signed our names to this specification in the presence of two subscribing witnesses.

HAROLD USHER.
CHARLES HENRY JASPER GOOCH.

Witnesses:
C. F. LYNN,
EDW. GEO. DAVIES.